(12) United States Patent
Hardy

(10) Patent No.: US 7,599,770 B2
(45) Date of Patent: Oct. 6, 2009

(54) APPARATUS AND METHOD FOR TRACKING VEHICLE TRAVEL AND EXPENDITURES

(76) Inventor: Cynthia Hardy, 324 W. K St., Benicia, CA (US) 94510

( * ) Notice: Subject to any disclaimer, the term of this patent is extended or adjusted under 35 U.S.C. 154(b) by 537 days.

(21) Appl. No.: 11/300,524

(22) Filed: Dec. 14, 2005

(65) Prior Publication Data

US 2007/0150139 A1 Jun. 28, 2007

(51) Int. Cl.
*G01C 21/14* (2006.01)
*G06G 7/78* (2006.01)
(52) U.S. Cl. .................. 701/35; 701/213; 340/438; 342/357.07
(58) Field of Classification Search .................. 701/35, 701/29, 33, 200, 201, 207, 213; 340/438, 340/439; 342/357.07
See application file for complete search history.

(56) References Cited

U.S. PATENT DOCUMENTS

| 5,046,007 | A | * | 9/1991 | McCrery et al. | 701/35 |
|---|---|---|---|---|---|
| 5,337,236 | A | * | 8/1994 | Fogg et al. | 701/35 |
| 5,787,373 | A | * | 7/1998 | Migues et al. | 701/33 |
| 5,862,500 | A | * | 1/1999 | Goodwin | 701/35 |
| 5,893,893 | A | * | 4/1999 | Holt et al. | 701/35 |
| 6,064,929 | A | * | 5/2000 | Migues et al. | 701/35 |
| 6,088,636 | A | * | 7/2000 | Chigumira et al. | 701/26 |
| 6,301,533 | B1 | * | 10/2001 | Markow | 701/35 |
| 6,741,933 | B1 | | 5/2004 | Glass | |
| 6,856,933 | B1 | | 2/2005 | Callaghan | |
| 6,975,929 | B2 | * | 12/2005 | Maruyama | 701/35 |
| 7,117,075 | B1 | * | 10/2006 | Larschan et al. | 701/35 |

* cited by examiner

*Primary Examiner*—Tan Q Nguyen
(74) *Attorney, Agent, or Firm*—C. Bart Sullivan

(57) ABSTRACT

A system and method is provided to track and log the distance traveled by a vehicle during a trip and other expenditures related to the trip. The system is capable of categorizing the trip as business or pleasure. In one embodiment, a tracking device receives global positioning data and/or distance data from the vehicle's odometer. The system receives and stores travel data such as voice, geographic location, receipts, time, date, notes, pictures, etc. to provide verification for the purpose of the trip. In one configuration, the system queries the user for verification data at various intervals such as when the user starts the trip or when the motion of the vehicle has stopped for a predetermined length of time. The system can display the trip information to the user and allow the user to output the travel data to another device such as a printer and/or a third party, etc.

20 Claims, 7 Drawing Sheets

ROUTE 1-4 DETAIL TAX DATA 502

504
DATE: May 17, 2005   506   508

| | |
|---|---|
| Start Mileage: | 47,200 Miles | 510
| Stop Mileage: | 47,368 Miles | 511
| Total Business Mileage: | 168 Miles | 512
| Total Other Mileage: | 14 Miles | 513
| Route 1 Data:<br>Brianna-Shannon Inc.<br>Address: 1214 West K Street<br>City: Fresno<br>State: CA<br>ZIP: 94511 | Distance Travelled: 168 Miles<br>Purpose: Business<br>Notes: Provides Dance<br>Instruction   520<br>Lunch: $83 : receipt<br>Location: First Street Cafe<br>With: Brianna and Shannon | 514
| Route 2 Data:<br>Jensen Furniture Inc.<br>Address: 5009 Palmetto<br>City: Los Angeles<br>State: CA<br>Zip: 94333 | Distance Travelled: 183 Miles<br>Purpose: Business<br>Notes: Furniture Account<br>Dinner: 121.40<br>With: Florence Dorsen<br>Other Data: photos  522 | 515
| Route 3 Data:<br>Donna's Diner<br>Address: 918 Ocean View<br>City: Santa Cruz<br>State: CA<br>Zip: 94333 | Distance Travelled: 247 Miles<br>Purpose: Business<br>Notes: Restaurant client to<br>discuss new franchise<br>With: Donna & Warren Robinson | 516
| Route 4 Data:<br>Office<br>Address: 517 Warren Way<br>City: Benicia<br>State: CA<br>Zip: 94510 | Distance Travelled: 98 Miles<br>Purpose: Business<br>Notes: Return from trip | 517

APPARATUS AND METHOD FOR TRACKING VEHICLE TRAVEL AND EXPENDITURES

BACKGROUND OF THE INVENTION

1. Field of the Invention

Embodiments of the present invention generally relate to tracking travel. More specifically, the present invention relates to tracking vehicle travel and expenditures related to business.

2. Description of the Related Art

Business travel is becoming an increasing part of every businessperson's business activities. Generally, many business expenses are considered tax-deductible in the United States and in other countries. Businesses report business deductions such as business travel to tax agencies such as the Internal Revenue Service (IRS). Often, business owners, employees, and other people involved in a business use a tax reimbursement form offered by their employer or business to report business expenses.

One tax expense offered by the IRS, for example, is a deduction for business travel related to the distance the businessperson traveled using a vehicle such as an automobile. For example, in 2005, the tax deduction is $0.33 a mile. At that deduction rate, a 1000-mile trip could lead to a $320 tax deduction. Unfortunately, the IRS has strict rules to claim the mileage deduction. Currently, a business traveler must keep accurate records of the mileage, the purpose of the trip, and with whom they met with. To meet the IRS deduction rules, business travelers often use notes and keep travel logs to verify the distance and purpose of the travel. As travel often involves a mixture of business and pleasure, it is generally difficult to keep an accurate accounting of the business travel. Many business travelers find accounting for business travel a cumbersome task. Due to the arduous accounting, many business travelers just estimate their travel mileage, or worse, just use a percentage of the automobile odometer reading at the end of the year without very little if any verification as their tax deductible mileage.

Conventional systems used to track mileage generally involve the user having to remember certain items to verify the trip such as geographic location. Some have tried to solve this problem, for example, U.S. Pat. No. 6,856,933 describes a key-fob style mileage tracker that uses the opening and closing of the vehicle door to start and stop the mileage tracking and can be used to store mileage for business trips with GPS information. Unfortunately, such systems do not provide proper verification of the business trip for tax purposes, further such systems have no way of identifying the user of the vehicle making it more difficult to verify that the individual actually made the trip.

Therefore, what is needed is a method and apparatus configured to allow a business traveler to accurate account for business mileage that is easy to use and cost effective.

SUMMARY OF THE INVENTION

An embodiment of the present invention provides an apparatus for tracking vehicle travel and expenses related to the travel. The apparatus includes a travel determination device configured to determine a distance traveled by an vehicle, a distance log device configured to receive and log travel data generated by the travel determination device, a travel identification device configured to categorize the distance traveled as business or pleasure, a transceiver configured to wirelessly output the travel data to a user thereof, and a data gathering device used to record receipts, images, and other travel verification data. The travel identification device corroborates the type of trip and a user making the trip using travel verification data received from the user and local data obtained from the locations visited during the travel.

One embodiment of the present invention provides a system for tracking and logging the distance traveled by a vehicle. The system includes a travel monitoring device configured to monitor a distance traveled by the vehicle, a travel logging device configured to store vehicle travel data received from the travel monitoring device, a travel identification device configured to determine whether the vehicle travel is related to business or pleasure, a travel type validation device configured to receive vehicle travel data indicative of business travel or pleasure travel, and a travel data output device configured to output the travel data to a user thereof. In one embodiment, the vehicle travel data is indicative of the purpose of the travel with respect to locations visited during the vehicle travel for a specific user.

Another embodiment of the present invention is a method for tracking and logging the distance traveled by a vehicle. The method includes querying a user for information about vehicle travel, categorizing the vehicle travel as business or pleasure, determining the distance traveled during the vehicle travel, receiving validation data during the vehicle travel, and associating the validation data with the vehicle travel. In one embodiment, at least some of the validation data is received without the user's knowledge.

These and other embodiments of the invention are described in further detail below.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the accompanying drawings in which:

FIG. 5 is a high-level illustration of one embodiment of a tax data mode for the vehicle travel tracking system of FIG. 1 in accordance with embodiments of the invention.

DETAILED DESCRIPTION OF THE PREFERRED EMBODIMENT

Figure 1:
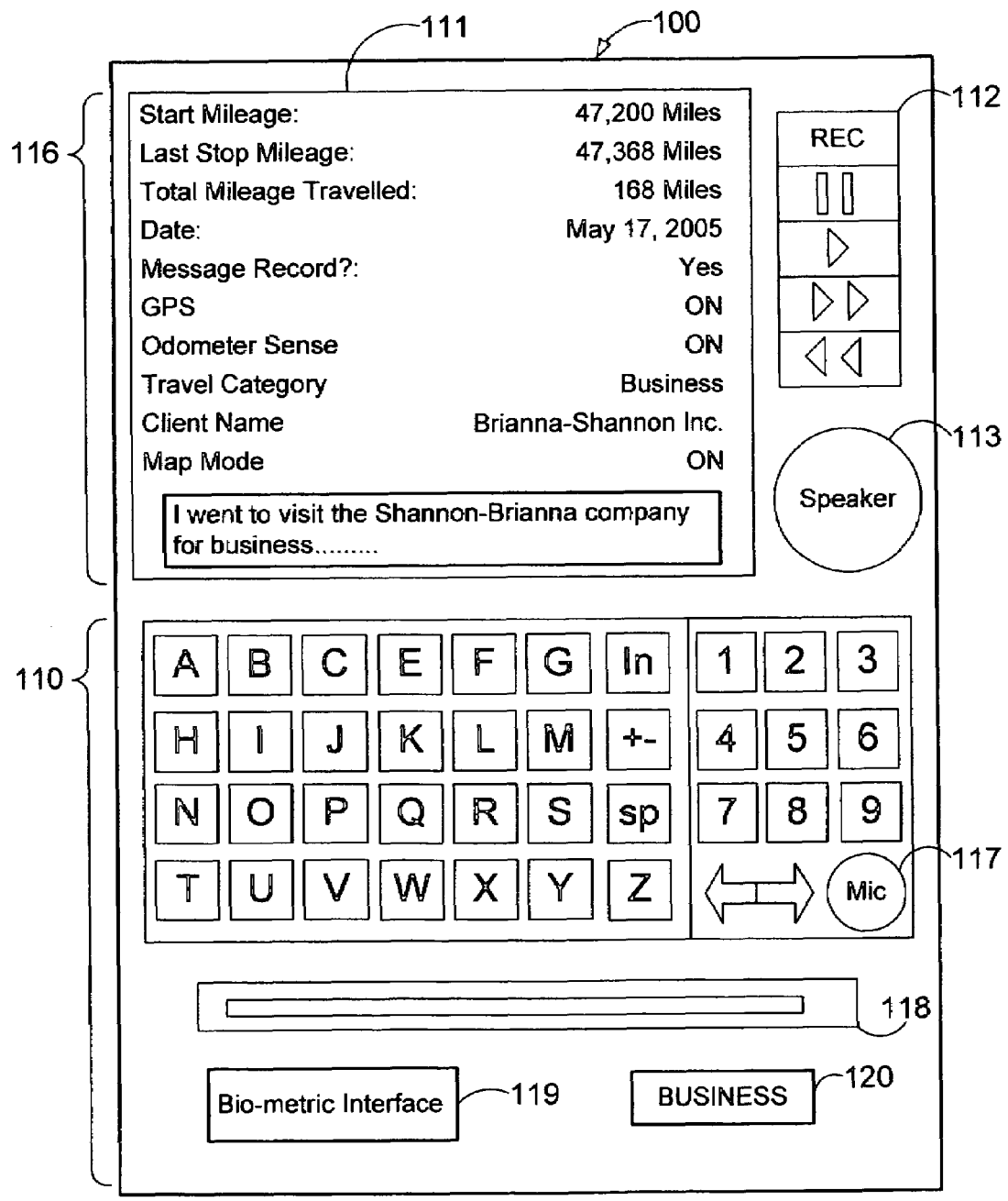
FIG. 1 is a high-level illustration of one embodiment of a vehicle travel tracking system in accordance with embodiments of the invention.

The present invention pertains to tracking travel of a vehicle and travel data associated with the travel. In one embodiment, a vehicle travel tracking system is used to record the distance traveled by the vehicle along with travel verification data. The vehicle travel tracking system may be used to provide verifiable proof for the purpose of the travel. The vehicle travel tracking system uses prompts, such as voice prompts, to query a user if the travel is for business or not for business. The vehicle travel tracking system may be used to track travel related to business and/or non-business travel. For business travelers the vehicle travel tracking system may be used to provide proof that a particular trip or portion thereof was for business. The vehicle travel tracking system is capable of receiving verification data from receipts, and data entry by the user. In addition, the vehicle travel tracking system is capable of receiving travel verification data from cameras, scanners, voice recorders, and bio-metric sensors, and the like. The vehicle travel tracking system may be used to provide the distance data and travel verification data to third parties such as accountants and tax bodies such as the Internal Revenue Service (IRS). The vehicle travel tracking system may also be used to keep track of non-business trips to allow a user to determine if they are within a travel budget. The vehicle travel tracking system may be configured as a user portable electronic device and/or integrated into a vehicle electronic system.

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Embodiments of the present invention are described in terms of wireless communication systems such as defined in IEEE 802.11, and networks such as Wireless Local Area Network (WLAN), Wireless Wide Area Networks (WWAN), and other networks utilizing data packet communication such as the Internet. However, it is understood the present invention is not limited to any particular communication system or network environment. For example, embodiments of the present invention may use analog or cellular types of communication systems.

Figure 2:
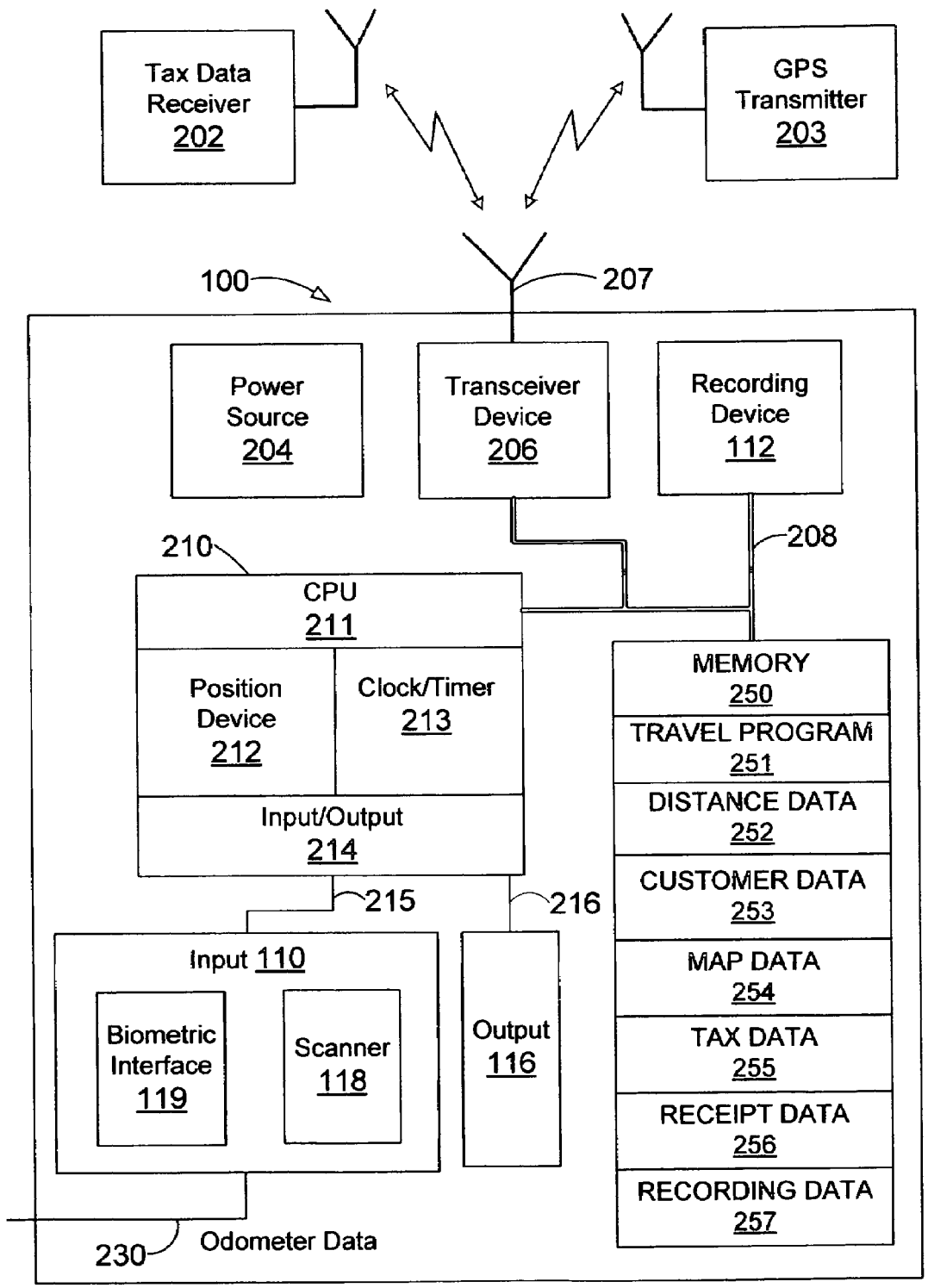
FIG. 2 is a high-level block diagram illustration of one embodiment of the vehicle travel tracking system of FIG. 1 in accordance with embodiments of the invention.

FIG. 1 is a high-level illustration and FIG. 2 is a high-level block diagram of one embodiment of a vehicle travel tracking system 100. Vehicle travel tracking system 100 includes a data output portion 110 and data input portion 116. The input portion 116 is configured to receive input from a user (e.g., driver, passenger, operator, etc.) of a vehicle such as an automobile. The output portion 110 is capable of displaying information to a user. The vehicle travel tracking system 100 may be integrated with virtually any device capable of inputting information and providing a user thereof data. For example, the vehicle travel tracking system 100 may be a personal data assistant device (PDA), a computer, a portable navigation system, a cellular phone, and the like. The vehicle travel tracking system 100 may also be integrated with vehicle electronics such as a built-in navigation system, an odometer display, and the like.

Vehicle travel tracking system 100 includes data processor 210. Data processor 210 may be powered by power supply 204. Power supply 204 may be virtually any type of power supply that may be used to advantage and may use internal and/or external power sources such as batteries, AC-DC converters, and the like. Data processor 210 is electrically coupled to transceiver device 206, recording device 112, and memory 250 via bus 208. Transceiver device 206 includes antenna 207. Transceiver device 206 is capable of communicating with at least one transceiver 202 that is capable of receiving and transmitting data associated with, for example, tax data and vehicle travel. Transceiver 206 may also be capable of communicating with global positioning satellite 203.

For clarity, wireless communication is described herein between transceiver device 206 transceivers 202, and global positioning satellite 203, however it is contemplated that transceiver device 206 may communicate using other connection techniques as are known such, optical connections, and the like. For example, a transceiver device 206 may be a transducer capable of communicating with radio frequency waves over short range. In addition, transceiver device 206 may use other techniques and protocols for communication such as, USB, firewire (IEEE 1394), serial communication, cellular networks, parallel communication, infrared communication, Bluetooth, and the like.

Embodiments of the present invention are described in terms of an operator, however it is contemplated that an operator may be a user, a system administrator, third party user, a tax body such as the IRS, computer tracking system, and includes virtually any personnel and machine capable of utilizing data processed by vehicle travel tracking system 100.

Data processor 210 may be virtually any type of data processing that may be configured to perform embodiments of the present invention to advantage. In one embodiment, data processor 210 includes a Central Processing Unit (CPU) 211, positioning device 212, such as a global positioning system (GPS), compass, and the like, clock/timer 213, and an input/output (I/O) device 214 in communication therewith via bus 208. Bus 208 may be configured to couple data from the transceiver device 206, the recording device 112, to the data processor 210 and the memory 250, for example. CPU 211 may be under the control of an operating system that may be disposed in memory 250. Virtually any operating system or portion thereof supporting the configuration functions disclosed herein may be used.

In one embodiment, the data processor 210 is configured to communicate data associated with travel to a third party such as an employer or an accounting firm for data processing. For example, the employer may be interested in how much distance the vehicle traveled for business. Such travel data may be transmitted to such third party from antenna 207 to the antenna of the tax data receiver 202 for storage and analysis.

Clock/timer 213 may be virtually any type of timing device used to obtain a data and/or time. The data and/or time may be used to associate any travel data received during travel to a date and/or time. The date and/or time may be used in the process of corroborating the purpose and time of the travel. For example, if a business woman using the vehicle tracking system 100 has a meeting at 8:22 PM on Dec. 14, 2005, the clock/timer 213 may be used to date stamp any data associated with the travel to and from the meeting, and the meeting time and date as 8:22 PM, Dec. 14, 2005.

Memory 250 is preferably a random access memory sufficiently large to hold the necessary programming and data structures of the present invention. While memory 250 is shown as a single entity, it should be understood that memory 250 may in fact comprise a plurality of modules, and that memory 250 may exist at multiple levels, from high speed registers and caches to lower speed but larger direct random access memory (DRAM) chips.

Illustratively, memory 250 may include a travel program 251 that, when executed on CPU 211, controls at least some data processing operations of vehicle travel tracking system 100. Travel program 251 may use any one of a number of different programming languages. For example, the program code can be written in PLC code (e.g., ladder logic), a higher-level language such as C, C++, Java, or a number of other languages. While the travel program 251 may be a standalone program, it is contemplated that the travel program 251 may be combined with other programs such as an operating system used with a computer processor, a vehicle navigation system, and the like.

In one embodiment, memory 250 may include distance data 222. Distance data 222 may utilize and be part of a database program such as Microsoft Access™, Oracle® database, and other data base programs configured to store data for processing thereof. The distance data 222 may be processed by data processor 210 to process information associated with a distance a vehicle (not shown) has traveled. The distance data 222 may be in any form such as miles, kilometers, geographic coordinates, and the like.

Memory 250 may include customer data 253 including attributes associated with a vehicle such as vehicle identification number (VIN), registered owner, operator, and the like. Customer data 253 may also include data about customers. For example, customer data 253 may include customer names, business names, addresses, phone numbers, and the like. It is contemplated that customer data may be linked via antenna 207 to other compatible wireless devices such as cellular phones, PDAs, printers, WAN networks, and the like, capable of processing such customer data 253. For example, customer data 253 may be interchangeable and stored in an address book of another system such as a PDA.

In another embodiment, as part of the travel verification process, the customer data 253 may be received with or without the knowledge of the user. For example, when a user stops at a particular business location the travel program 251 may do a wireless search to verify the name and address of the business and then store that data into user data 253. In one embodiment, the transmissions from the user's cell phone or blackberry device may be surreptitiously (or not) recorded as well. This is advantageous as it is often easy to fake a business trip. Thus, with real-time data acquisition and employee data acquired for each location visited, an employer may be able to be ascertain that their employees are performing the travel as the company intended.

Memory 250 may include map data 254. The map data 254 includes data associated with geographic locations. For example, map data 254 could include geographic data associated with a particular travel route that is provided as an illustration to a user, for example on display 111. Map data 254 is not limited to the travel logged and may be used to provide the user with a route to follow and alternate routes. For example, travel data 254 in combination with travel program 251 may provide a suggested route from an office location to a client location. Similar to current map guidance programs, map data 254 in combination with travel program 251 may suggest new routes as if a user goes in a wrong direction, or strays from the suggested route.

In one embodiment, the travel data 254 includes data to remind the user of appointments, destinations, and the like. In combination with travel program 251, data used to remind a user may be preset to help remind the user of each appointment and time. It is contemplated that the travel program 251 may be adapted to compare the travel actually occurring to the intended travel. This is useful as it keeps the user aware of the travel itinerary. As not all travel goes as planned, such reminder data may be updated by the user or a third party such as the user's employer, even while the user is traveling. This is especially useful for delivery companies such as Federal Express and United Parcel Service, as they have routes and itineraries that often change.

Memory 250 may include tax data 255. Tax data 255 includes any data required for proof of travel to tax authorities. In one embodiment, as described below, tax data 255 includes sound data, visual data, and other types of data such as dates, odometer readings, GPS readings, biometric data, and the like capable of associating travel logged with evidence of the travel for tax deduction purposes. Tax data 255 may be data stored in other locations such as customer data 253, map data 254, receipt data 256, recording data 257, and the like. While illustrated separate in memory 250, tax data 255 may be a flag or indicator used to mark other stored data such as customer data 253 with a taxable deduction flag.

In one embodiment, memory 250 may include receipt data 256. Receipt data 256 may be input directly via the receipt scanner 118, for example, or may be input from a credit/debit card point-of-sale (POS) transaction. For example, if a businessperson takes a client to lunch, he/she can use the receipt scanner 118 to input the receipt from the lunch. She can also use the data processor 210 and transceiver device 206, to receive the lunch transaction via a wireless download, or she can use input device 110 to accept data from, for example, a smart credit/debit card. In one embodiment, the transceiver 206 may wirelessly accept the data from a smart credit/debit card. This is advantageous, as for example, the user does not have to scan receipts to input corroborating travel data.

In another embodiment, the memory 250 includes recording data 257. Recording data 257 may be used to store audible notes and sounds from recording device 112 or from other recording devices. Recording data 257 may also be used to store video data such as digital pictures, digital video, and the like, to corroborate the travel. For example, if Peter, a real estate appraiser (e.g., a user) is driving from his home office to an appraisal site, the pictures taken of the appraisal by Peter may be stored along with any video recorded during the trip in recording data 257. Such stored recordings may be used to corroborate ("fingerprint") the purpose of the trip.

In one embodiment, recording device 112 may be used to record sounds, and other data that may be used for travel verification. Recording device 112 may be integrated with vehicle travel tracking system 100, or may be detachable. For example, recording device 112 may be a digital recorder that may be detached to record a business conversation.

The input device 110 can be virtually any device to give input to power data processor 210. For example, a keyboard, keypad, light-pen, touch-screen, track-ball, or speech recognition unit, audio/video player, and the like could be used for input device 110. Input device may also include other types of keys, buttons, etc., such as "business" button 120 to allow a user to quickly assign a particular trip category to their travel. To input data, input device 110 couples input data to I/O 214 via signal 215. For example, data input via a keypad would be coupled to I/O device via signal 215. To output information, the data processor 210 may be in communication with an output device 116 via signal 216. The output device 116 can be virtually any device to give output from data processor 210 to a user thereof, e.g., any conventional display screen, printer, set of speakers along with their respective interface cards, i.e., video card and sound card, etc. For example, output device 116 may be configured to output display 111 and/or sound via speaker 113 connected to I/O device 214. Although shown separately from the input device 110, output device 116 and input device 110 could be combined. For example, a display screen with an integrated touch-screen, a display with an integrated keyboard, or a speech recognition unit combined with a text speech converter could be used. The text speech convert may be used to, for example, convert voice recordings from recording device 112 to text.

The input device 110 receives data from the odometer of the vehicle via odometer input signal 230. While a hard-wired version of the odometer input signal 230 is contemplated, it is conceivable that the odometer input signal 230 may be a wireless connection. In another embodiment, the input device 110 may act as an interface between the vehicle tracking device 100 and an external device such as an external computer, external storage device, video camera, digital camera, and other devices that may be used to advantage. It is contemplated that input device 110 may operate with any number of different interface protocols and formats such as USB, firewire, and the like.

The input device 110 may include a scanner 118 and a biometric interface 119. Scanner 118 is capable of scanning data such as receipts, notes, photographs, business cards, and the like. Scanner 118 is an optional device as input device 110 may receive data from external scanners, video equipment, and the like. Scanner 118 is capable of communicating with data processor 210 via bus 216. In one operational embodiment, scanner 118 may be used to scan receipts and business cards and other information pertinent to the vehicle travel for corroboration thereof. Scanner 118 may also facilitate optical character recognition (OCR) that may allow a user to convert printed data into searchable data that is stored, for example, in receipt data 256. The data processor 210 then associates the scanned images with the other information. For example, a businesswoman scans a lunch receipt corresponding to a meeting with a client. The lunch receipt from the scanner 118 and customer data are stored and associated by data processor 210. The associated data may then be retrieved for business travel verification. The biometric interface 119 is capable of receiving some biometric data such as from a finger, eye, and the like. The biometric interface is advantageous as it allows a user to "fingerprint" the travel data to verify that they traveled.

In one embodiment, the input device 110 is configured to receive data directly from an electronic portable device (not shown) such as an iPod®, smart credit/debit card, cellular phone, PDA, RFID (Radio Frequency Identification device), transponder, and the like. For example, the input device 110 may receive data about a business lunch purchase directly from the businesswoman's credit card she used during a trip. The input device 110 may receive the data directly via a contact interface and/or may receive the data via antenna 207 using RF protocols or via other types of wireless connections such as Bluetooth. As mentioned above, reading data directly from a portable consumer device is advantageous as it allows the user to keep track of data without having to scan receipts, etc.

A TRAVEL TRACKING EXAMPLE

Figure 3:
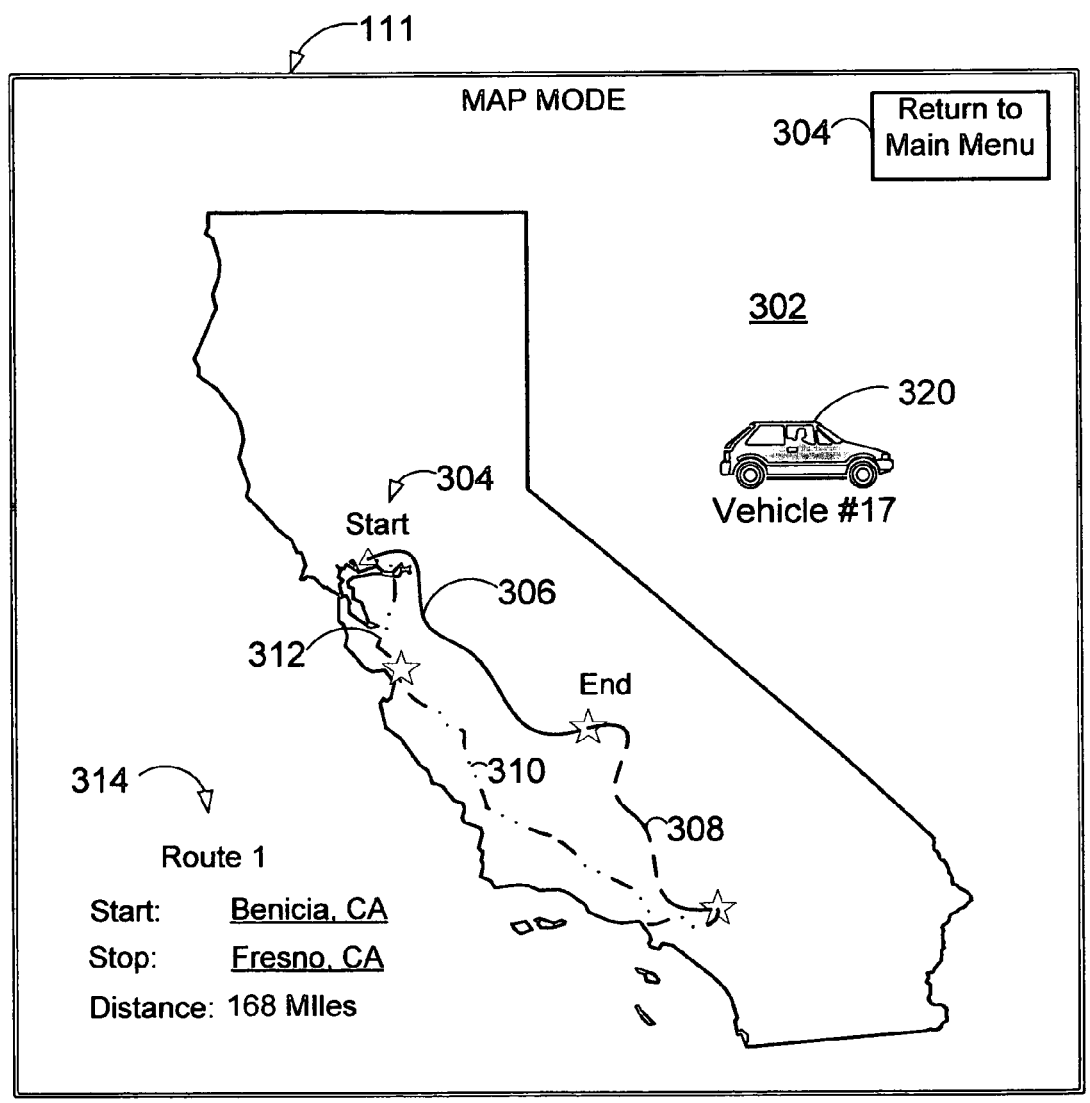
FIG. 3 is a high-level illustration of one embodiment of a map mode for the vehicle travel tracking system of FIG. 1 in accordance with embodiments of the invention.

FIG. 3 is a high-level illustration of one embodiment of a map mode 300 for the vehicle travel tracking system 100 of FIG. 1. The vehicle travel tracking system 100 may be configured for different modes of operation. In one operational embodiment, the travel program code is executed to generate a "Map Mode". The map mode may be displayed for example, on display 111. The map mode may be used to provide the vehicle operator or passenger of the vehicle a visual indication of the travel and other pertinent data associated with the vehicle travel. For example, as illustrated in FIG. 3, map display 302 shows the state of California and the travel associated with a trip 304. As the vehicle travel tracking system 100 may be portable, the vehicle identification number (VIN) or other indicators may be used to associate the trip 304 with a particular vehicle. This is advantageous as a user of the vehicle travel tracking system 100 may use different vehicles. For example, a vehicle #17 is displayed on the display 111. In one embodiment, each segment of the trip 304 is shown. If the display 111 is a touch-screen, a user may be able to touch the different segments to see data associated therewith as described further below. As illustrated, trip 304 includes segment 306, 308, and 310. Each segment 306, 308, and 310 are indicative of travel to one or more clients. Depending on the purpose of the trip, there may be only one segment or multiple segments. For example, consider the case were a business traveler travels to a meeting in one location and then travels to a vacation spot. The trip may have two segments, one for the trip to the meeting from the user's office, and another non-business related segment from the business meeting to the vacation spot.

In one embodiment, similar to as described above, some of the verification data need not be received from the user. For example, the vehicle travel tracking system 100 may be set to secretly gather data during the travel as further verification. In one case, the vehicle travel tracking system 100 gathers address data and business data at each location. In some cases, the vehicle travel tracking system 100 may compare the name of the person being visited as input by the user to a database for the company if one is available. To make it easier for the user to input names, addresses, and the like, the vehicle travel tracking system 100 may provide a list of names for the user to select from. This secret data may be stored and transmitted to the company for example, without the knowledge of the user for trip verification and may be used, for example, for employee assessment.

As illustrated, "route 1" (e.g., trip segment 306) starts in Benicia, Calif. and arrives in Fresno Calif. The vehicle travel tracking system 100 receives data from the odometer of the vehicle 320 and/or the GPS transmitter 203 and calculates the distance as 168 miles. The destination is a company called the Brianna-Shannon Company, a dance shop. The distance of 168 miles may be stored in distance data 252. When the businesswoman starts segment 306, the vehicle travel tracking device 100 may ask the businesswoman if this is a trip for business or pleasure, for example, though speaker 113. If the businesswoman responds "business", recording device 112 records the businesswoman's voice. The recorded voice is then stored in recording data 257 and associated with segment 306 stored, for example, in map data 254.

"Route 2" (e.g., segment 308) illustrates travel from Fresno to Los Angeles. The vehicle travel tracking system 100 receives data from the odometer of the vehicle 320 and/or the GPS transmitter 203 and calculates the distance as 183 miles. The destination is a company called Jenson Furniture Manufacturing. The distance of 183 miles may be stored in distance data 252. When the businesswoman starts segment 308 in Fresno, the vehicle travel tracking device 100 may query the businesswoman if this is a trip for business or pleasure, for example, though speaker 113. The businesswoman may respond by inputting "business" into input device 110 or speaking into recording microphone 117. If the businesswoman uses microphone 117, recording device 112 records the businesswoman's voice for travel type verification. The recorded voice is then stored in recording data 257 and associated with segment 308 stored, for example, in map data 254.

"Route 3" (e.g., segment 310) illustrates travel from Los Angeles Calif. to Santa Cruz Calif. to meet a client "Donna's Diner". The vehicle travel tracking system 100 receives data from the odometer of the vehicle 320 and/or the GPS transmitter 203 and calculates the distance as 247 miles. The distance of 247 miles may be stored in distance data 252. When the businesswoman starts segment 310 in Los Angeles, the vehicle travel tracking device 100 may ask the businesswoman if this is a trip for business or pleasure, for example, though speaker 113. If the businesswoman responds "business", recording device 112 records the businesswoman's voice. The recorded voice is then stored in recording data 257 and associated with segment 310 stored, for example, in map data 254.

"Route 4" (e.g., segment 312) illustrates travel from Santa Cruz Calif. back to the businesswoman's office in Benicia. The vehicle travel tracking system 100 receives data from the odometer of the vehicle 320 and/or the GPS transmitter 203 and calculates the distance as 98 miles. The distance of 98 miles may be stored in distance data 252. When the businesswoman starts segment 312 in Santa Cruz, the vehicle travel tracking device 100 may query the businesswoman if this is a trip for business or pleasure, for example, though speaker 113 and/or though a visual display 111. If the businesswoman responds "business", recording device 112 records the businesswoman's voice. The recorded voice is then stored in recording data 257 and associated with segment 312 stored, for example, in map data 254. This is advantageous, as the businesswoman's own voice is used to "fingerprint" the data for verification and analysis of third parties such as the employer, an accounting firm, the IRS, and the like.

Figure 4:
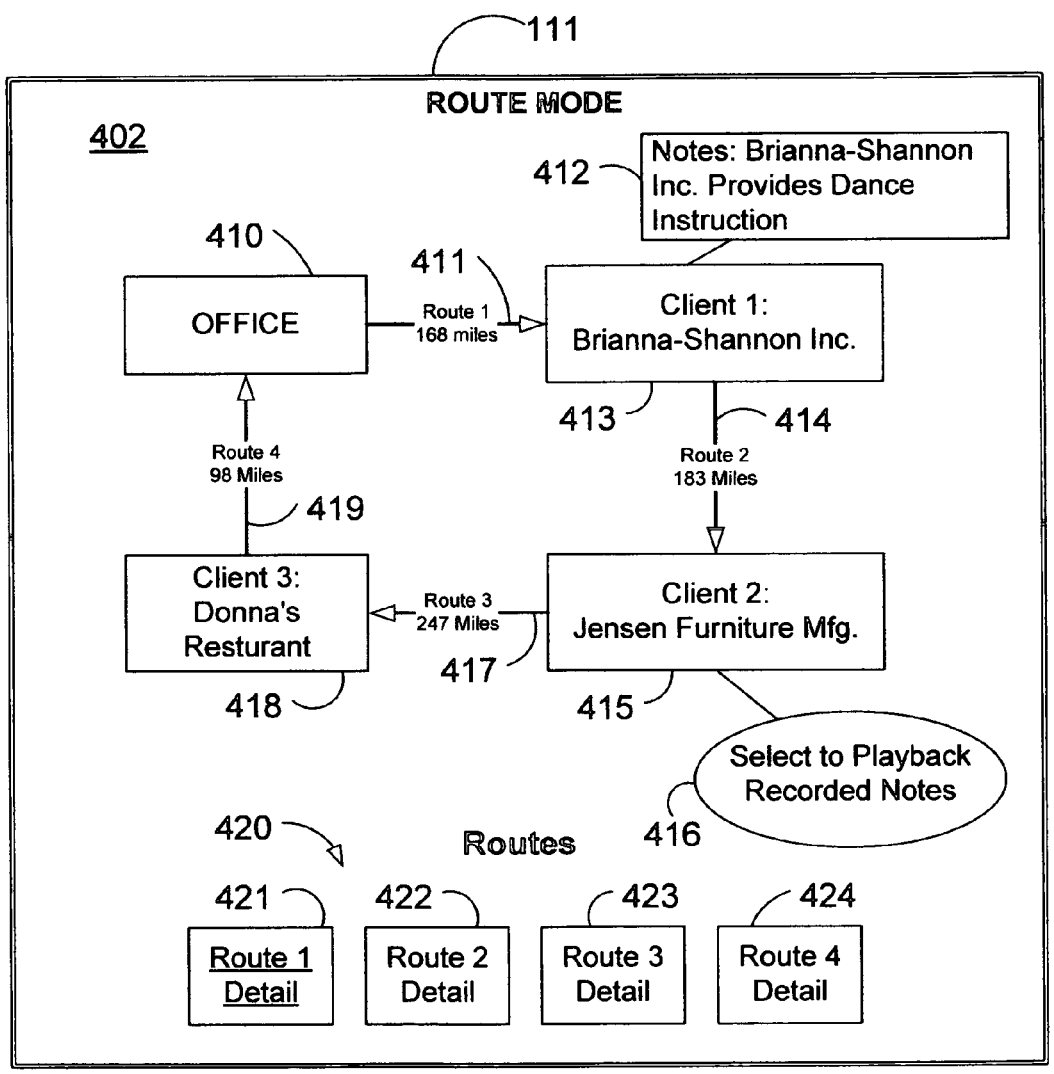
FIG. 4 is a high-level illustration of one embodiment of a route mode for the vehicle travel tracking system of FIG. 1 in accordance with embodiments of the invention.

FIG. 4 is a high-level illustration of one embodiment of a route mode 400 for the vehicle travel tracking system 100. Route mode 400 is an alternative display from map mode 300. Route mode 400 is a graphical display of the route the businesswoman took to and from her office in Benicia. The route mode 400 may provide more detailed information such as the distance traveled, the client, the data received during the travel, etc. For example, route 1 is illustrated as connection 411 between office box 410 and client 1 box 412. Route 2 is illustrated as connection 414 between client 1 box 412 and client 2 box 415. Route 3 is illustrated as connection 417 between client 2 box 415 and client 3 box 418. Route 4 is illustrated as connection 419 between client 3 box 415 and office box 410. As output device 112 may be a touch screen type of display, a user may simply touch the various parts of the route to see information in more detail. For example, note window 411 may be activated via a user touching the note window 411. The note window 411 may expand to display the notes input into input device 110 pertaining to the Brianna-Shannon Company. A recording playback box 416, for example, may be used to play back recordings from recording device 112 pertaining to a particular segment. Illustratively, recording playback box 416 is illustrated as being coupled to client 2 box 415 (Jenson Furniture Manufacturing). In one embodiment, more detail information may be accessed using route detail boxes 421, 422, 423, 424, etc. For example, selecting box 421 will access details about the travel to client 1, the Brianna-Shannon Company.

FIG. 5 is a high-level illustration of one embodiment of a tax data mode 500 for the vehicle travel tracking system 100. Tax data mode 500 allows a user of the vehicle travel tracking system 100 to output data related to their travel and travel expenses. For example, a user may operate vehicle travel tracking system 100 to show all of the travel the user has taken in Vehicles, the distance traveled, the odometer readings, and verification data. Such travel data may be used to verify business travel to, for example, the IRS. In one embodiment, vehicle travel tracking system 100 may be used by one or more individuals. Therefore, vehicle travel tracking system 100 is capable of accessing data from memory 250 for different individuals and/or vehicles. For example, if Susan and JC are using the vehicle travel tracking system 100, Susan's travel data may be stored separate from JC's travel data.

In one embodiment, display 111 is used to form a travel data display 502. Travel data display 502 includes travel data 504 from, for example, memory 250. Travel data 504 may have a column 506 and a column 508. Column 506 may include data associated with a particular travel segment (e.g., segment 306) and/or overall travel data, e.g., start mileage, stop mileage, total business mileage. Column 508 may include data associated with column 506. Travel data 504 may include details about a particular trip. For example, time and date, start mileage row 510, stop mileage row 511, total business mileage row 512, total other mileage 513, contain distance data. Route 1 row 514, route 2 row 515, route 3 row 516, and route 4 row 517, may include details pertinent to each route for travel verification such as client name, date, time, purpose, etc. Travel data display 502 may also allow a user to see data associated with the travel. For example, under row 514, a lunch receipt scanned via scanner 118 may be accessed from memory 250 via receipt "receipt" link 520, and under row 515, photos related to the travel may be accessed via "photos" link 522. Although not specifically illustrated, the travel display may also be used to provide the reminders to the user. For example, reminders may be presented in display 111 in a dialog box intended to display reminders. Such reminders may be flashing or in a different displayed graphically different to help differentiate such reminders from other travel data.

In one embodiment, the travel data 504 including linked data such as receipts and photos (520, 522) may be printed via a printer (not shown) coupled to output device 112. In other embodiments, some or all of the travel data may be wirelessly transmitted via antenna 207 to the tax data receiver 202 (e.g., a server on a wireless network) for tax and/or accounting purposes. In one configuration, the tax mode display 502 may be printed and/or transmitted to verify the travel and travel expenditures to a third party server such as a server of the IRS, accounting firm, employer, etc.

Figure 6:
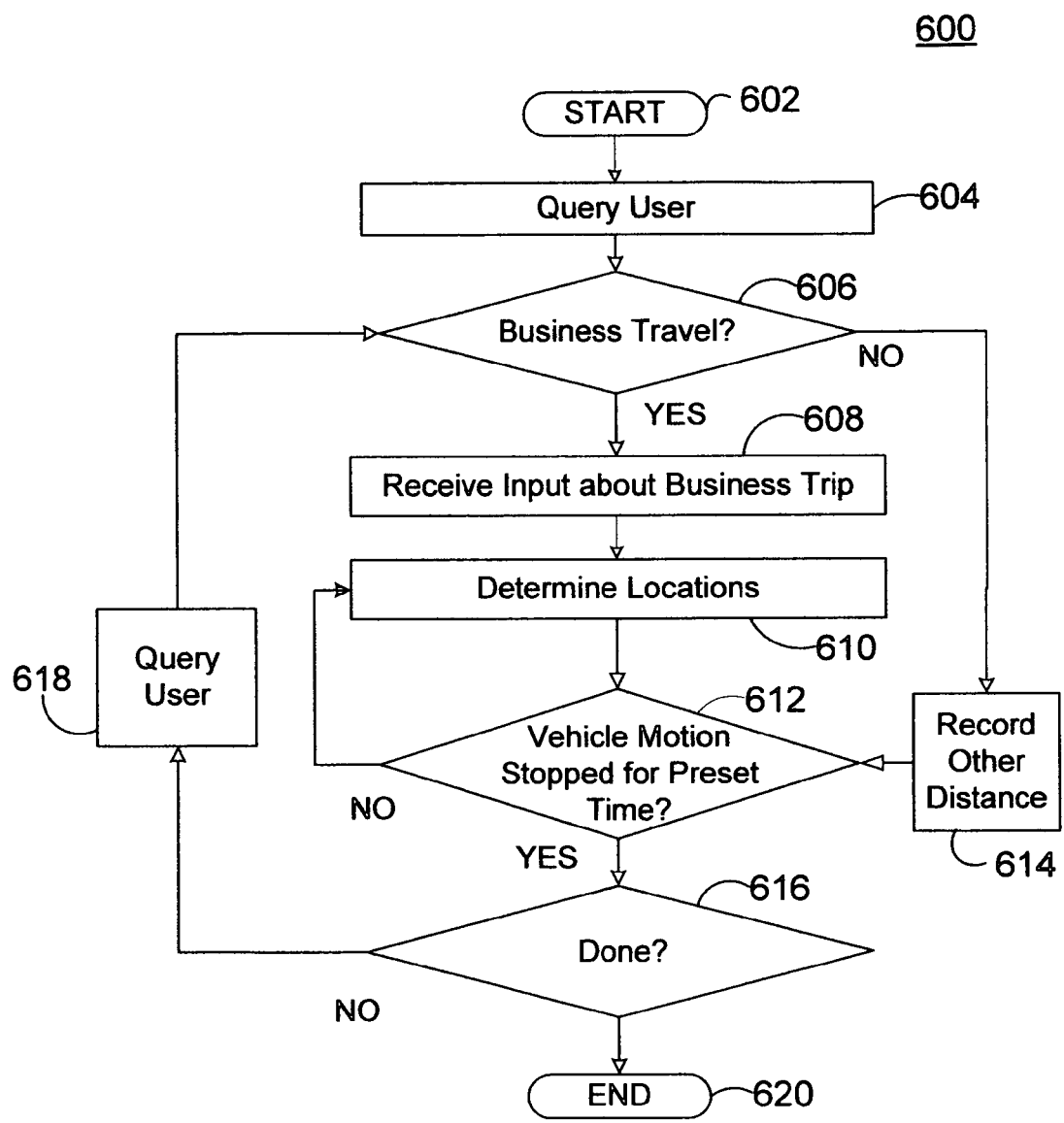
FIG. 6 is a high-level block diagram illustration one embodiment of a method of tracking vehicle travel and expenditures in accordance with embodiments of the invention.

FIG. 6 is a high-level block diagram illustration one embodiment of a method 600 of tracking vehicle travel and expenditures. Method 600 starts at step 602 when, for example, vehicle travel tracking system 100 is activated by a user thereof. At step 604, the method queries a user to determine if the trip is for business or pleasure. For example, vehicle travel tracking system 100 may store pre-recorded voice or textual prompts such as "Hello Shannon" and "Is your trip for business or pleasure?" "Please spell the name or enter the name in the keypad", "are you stopping to meet a client?", "please enter your receipts", and the like. Alternatively, instead of voice prompts, the vehicle travel tracking system 100 may simply beep to prompt the user to enter a category of the trip and a user may push a key such as "B" on the keypad, or a button called "business" 120, in order to activate tracking the travel for a business trip (e.g., segment 306, etc.).

At step 606, if the travel is for other travel than business, the method 600 proceeds to step 614 and optionally records the other travel data. If the travel is for business purposes, at step 608 the method 600 may query the user for more information about the trip. For example, vehicle travel tracking system 100 may be configured to begin taking readings from the GPS system to track the travel, the clock/timer 213 may begin to record the date and time of the trip, and the transceiver 206 may begin to interact with transponders encounter during the trip to record crossed bridges, toll roads, and the like. Advantageously, the transceiver 206 may be configured to act as a third party transponder similar to the FastTrak™ system in the San Francisco bay area, to let the toll transponder know that that the vehicle is in proximity thereto and record the toll for tax deduction purposes.

As it is important that some trip related data is used to "fingerprint" the data to the user, a user must enter some corroborative data besides just geographic data from the GPS signal. Therefore, if a user does not provide some corroborative data, the method 600 will ask the user respond via voice to provide corroborative data or via the bio-metric interface 119. If the user fails to provide corroborative data within predetermined guidelines (e.g., at least one phrase in the user's voice), the method 600 may mark the data un-corroborative. This is advantageous as it keeps others from falsely trying to use the user's system.

At step 610, the method 600 determines and stores the location of the vehicle travel. For example, when the user stops to meet a client, as described above the vehicle travel tracking system 100 may query the user for the reason to stop. Normally, this would be associated with the vehicle being turned on and off. However, as some vehicles are often left running, such as diesel trucks, at step 612, the method 600 queries the user after the vehicle has been motionless for a preset time. The preset time may be adjusted to accommodate normal stopping due to traffic lights, slow traffic, etc.

In one embodiment, at step 610 the method 600 adjusts the preset time relative to city traffic conditions or rural traffic conditions. For example, Vehicle travel tracking system 100 is capable of detecting the amount of stopping and starting the vehicle is experiencing and may query the user if they are doing short stops with clients. This is advantageous as, for example, a delivery truck, may make several short stops, the short stop time is therefore adjusted to accommodate the short stops without confusing the short stops with traffic stops. In addition, the GPS system may be configured to adjust the vehicle travel tracking system 100 if the GPS data indicates that the user is traveling on a road and stopping at intersections versus stopping at addresses adjacent to the route. If the user has stopped for the preset time, then at step 612, the method 600 may query the user to determine if the trip is finished.

In one configuration the method 600 may determine that the vehicle has not returned to the starting point and may record the travel as a single travel segment such as segment 306. As not all trips are return trips (e.g., they are one-way trips), therefore, the method 600 may temporarily mark the trip as ended until corroborated by the user. For example, vehicle travel tracking system 100 may query the user when a trip starts. When the vehicle is stationary for a predetermined time, the vehicle travel tracking system 100 may query the user if this is the end of the trip, or only a segment. Optionally, the user may manually mark the trip as ended in real time even though the vehicle has not stopped moving. This is advantageous for business people who are traveling on business but may take a detour to do some other activity not related to the business.

At step 616 if the travel is ended, the method 600 ends at 620. If however, the travel has not ended (e.g., only one segment has been traveled), the method 600 proceeds to 618 to query the user about the next travel segment. For example, vehicle travel tracking system 100 may mark a segment as ended when the user stops the vehicle for lunch, and then when the user starts to travel, vehicle travel tracking system 100 queries the user. As a trip may include many stop and starts, the vehicle travel tracking system 100 may be set to query the user if the new travel segment is related to the previous segment. For example, the vehicle travel tracking system 100 may ask the user "is this new travel or a continuation of the previous travel?" This is advantageous as this mode allows a user to associate different segments with a particular trip.

Figure 7:
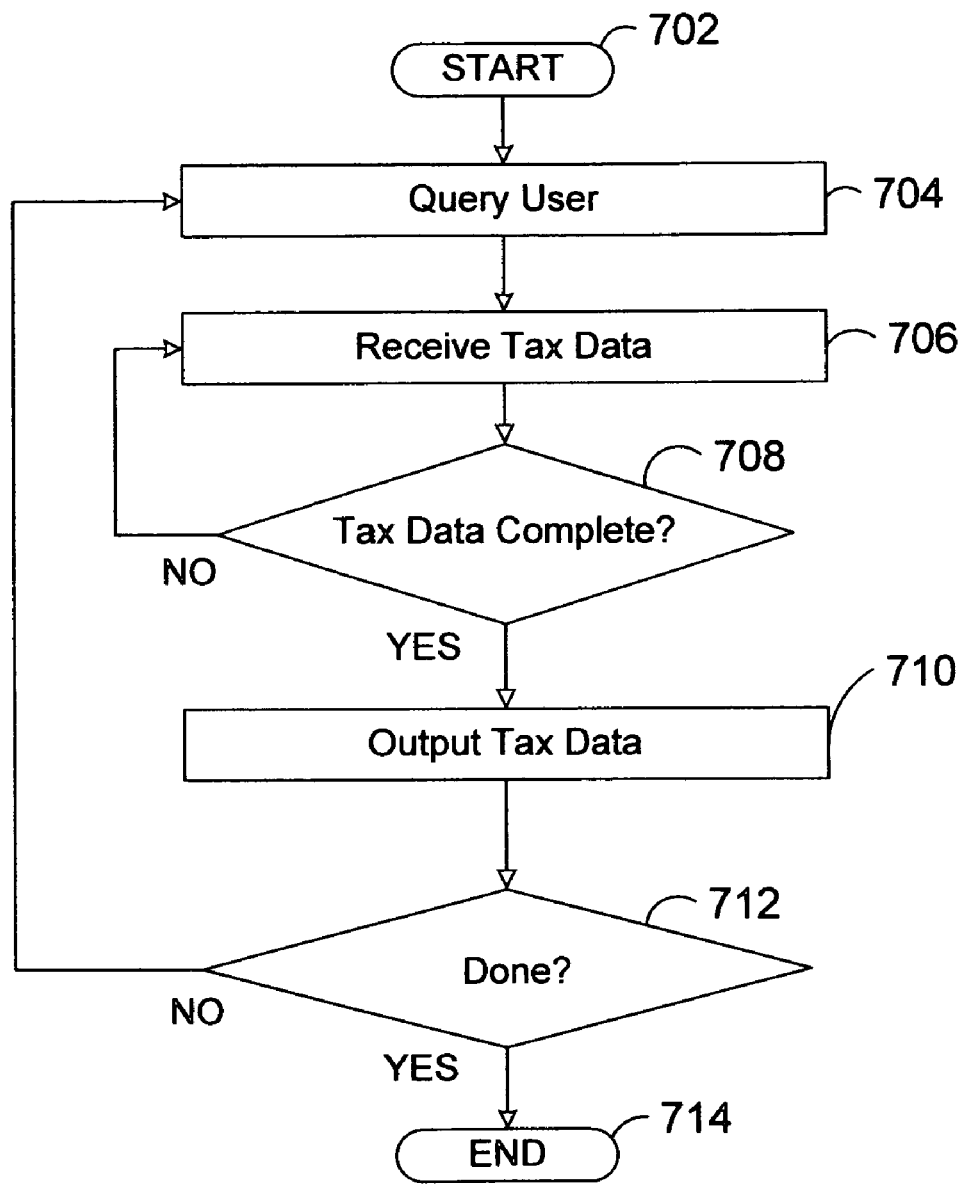
FIG. 7 is a high-level flow diagram of one embodiment of a method of generating tax deduction data related to vehicle travel in accordance with embodiments of the invention.

FIG. 7 is a high-level flow diagram of one embodiment of a method 700 of generating tax deduction data related to vehicle travel. Method 700 starts at step 702 when, for example, vehicle travel tracking system 100 is activated by a user thereof. At step 704, the method queries a user to determine the type of tax deduction data desired. For example, the user may be interested in generating data pertaining to one trip, or for numerous trips. The tax data output may include any type of data useful for tax deduction purposes. In one embodiment, the tax data includes distance data, along with verification data such as geographic location data, receipt data, bio-metric data, credit/debit card data, image data, sound data, time and date, GPS positioning data, and the like.

At step 708, the method 700 determines if the tax data generation is complete. If so, at step 710, the tax data is outputted to a user thereof such as an employer. The tax data may be outputted any number of ways such as via printing, facsimile, email, or wirelessly transmitted. In one embodiment, the tax data is loaded onto a server of the employer for example, using the Internet. For example, the employer may have a website capable of uploading the tax data. If the method 700 is finished at step 712, the method 700 ends at step 714. If however, the method 700 is not complete, at step 712 the method proceeds to step 704.

In one operational example, method 700 may be performed by vehicle travel tracking system 100. For example, a user of vehicle travel tracking system 100 may select an output function of the vehicle travel tracking system 100. The output may include data such as shown on FIG. 5. Such data may be used to verify the distance traveled, the vehicle used, the traveler, and the travel verification data as described herein.

Embodiments of the present invention pertain to specific method steps implementable on computer systems. In one embodiment, the invention may be implemented as a computer program-product for use with a computer system. The programs defining the functions of at least one embodiment can be provided to a computer via a variety of computer-readable media (i.e., signal-bearing medium), which include but are not limited to, (i) information permanently stored on non-writable storage media (e.g. read-only memory devices within a computer such as read only CD-ROM disks readable by a CD-ROM or DVD drive; (ii) alterable information stored on a writable storage media (e.g. floppy disks within diskette drive or hard-disk drive); or (iii) information conveyed to a computer by communications medium, such as through a computer or telephone network, including wireless communication. The latter specifically includes information conveyed via the Internet. Such signal-bearing media, when carrying computer-readable instructions that direct the functions of the invention, represent alternative embodiments of the invention. It may also be noted that portions of the product program may be developed and implemented independently, but when combined together are embodiments of the invention.

Any of the above described steps may be embodied as computer code on a computer readable medium. The computer readable medium may reside on one or more computational apparatuses and may use any suitable data storage technology.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art, upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety. None is admitted to be prior art.

The invention claimed is:

1. An apparatus for tracking vehicle travel comprising:
    a travel determination device configured to determine a distance traveled by a vehicle;
    a distance log device configured to receive and log travel data generated by the travel determination device;
    a travel identification device configured to verify the distance traveled as business or pleasure, wherein the travel identification device corroborates the type of trip and a user making the trip using travel verification data received from the user and local data obtained from the locations visited during the travel, wherein the travel identification device is configured to obtain at least some of the local data automatically without intervention by the user; and
    a transceiver configured to output the travel data.

2. The apparatus of claim 1, wherein the travel determination device comprises an odometer data processing device.

3. The apparatus of claim 1, wherein the travel determination device comprises a global positioning device.

4. The apparatus of claim 1, wherein the travel determination device comprises a compass.

5. The apparatus of claim 1, wherein the distance log device comprises a distance processing system capable of storing distance data.

6. The apparatus of claim 1, wherein the travel identification device comprises an input device capable of receiving data associated with the vehicle trip.

7. A system for tracking and logging the distance traveled by a vehicle, the system comprising:
    a travel monitoring device configured to monitor a distance traveled by the vehicle;
    a travel logging device configured to store vehicle travel data received from the travel monitoring device;
    a travel identification device configured to determine whether the vehicle travel is related to business or pleasure;
    a travel type validation device configured to receive vehicle travel data indicative of business travel or pleasure travel, wherein the vehicle travel data is indicative of the purpose of the travel with respect to locations visited during the vehicle travel for a specific user, wherein at least some of the vehicle travel data is local data obtained during the vehicle travel from one or more of the locations visited, wherein at least some of the local data is obtained automatically without intervention by the user; and
    a travel data output device configured to output the travel data.

8. The apparatus of claim 7, wherein the travel monitoring device comprises an input device configured to receive data from an odometer of the vehicle.

9. The apparatus of claim 7, wherein the travel monitoring device comprises an input device configured to receive data from a global positioning system.

10. The apparatus of claim 7, wherein the travel logging device comprises a storage device configured to store distance data.

11. The apparatus of claim 7, wherein the travel logging device comprises a storage device configured to store geographic data.

12. The apparatus of claim 7, wherein the travel identification device comprises an input device configured to receive data associated with the purpose of the vehicle travel.

13. The apparatus of claim 12, wherein the local data associated with the purpose of the vehicle travel comprises local receipts, or voice data, or video data, or geographic data, or business identification data, or time data, or date data, or business documentation data.

14. A method for tracking and verifying the distance traveled by a vehicle, the method comprising:
    querying a user for information about vehicle travel;
    categorizing the vehicle travel as business or pleasure;
    determining the distance traveled during the vehicle travel;
    receiving validation data during the vehicle travel; wherein the validation data is
    associated with the purpose of the vehicle travel and wherein at least some of the validation data is received without the user's knowledge, wherein at least some of the validation data is local data obtained automatically during the vehicle travel from one or more locations visited by the user; and
    associating the validation data with the vehicle travel.

15. The method of claim 14, wherein querying the user for information about the vehicle trip comprises prompting the user to verify if the vehicle travel is for business or pleasure.

16. The method of claim 14, wherein querying categorizing the vehicle travel comprises marking vehicle data associated with the vehicle travel as business or pleasure.

17. The method of claim 14, wherein determining the distance traveled comprises receiving distance data from an odometer of the vehicle or a global positioning system.

18. The method of claim 14, wherein receiving validation data comprises receiving data associated with the vehicle travel.

19. The method of claim 18, wherein the validation data comprises receipts, or address verification data, or business type data, or voice data, or video data, of geographic data, or business identification data, or time data, or date data, or business documentation data associated with the vehicle travel for verification thereof.

20. The method of claim 14, wherein associating the validation data comprises marking the validation data as either business or pleasure.

* * * * *